(12) United States Patent
Yeh (10) Patent No.: US 11,954,329 B2
(45) Date of Patent: Apr. 9, 2024

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 223 days.

(21) Appl. No.: 17/721,358

(22) Filed: Apr. 15, 2022

(65) Prior Publication Data
US 2023/0297233 A1    Sep. 21, 2023

(30) Foreign Application Priority Data

Mar. 16, 2022  (TW) .................................. 111109563

(51) Int. Cl.
*G06F 3/06*    (2006.01)
(52) U.S. Cl.
CPC .......... *G06F 3/0604* (2013.01); *G06F 3/0652* (2013.01); *G06F 3/0679* (2013.01)
(58) Field of Classification Search
CPC ..... G06F 3/0604; G06F 3/0652; G06F 3/0679
See application file for complete search history.

(56) References Cited

U.S. PATENT DOCUMENTS

2002/0041517 A1* 4/2002 Kim ................... G06F 12/0246
365/185.11

FOREIGN PATENT DOCUMENTS

| TW | I615713 | 2/2018 |
|---|---|---|
| TW | I661299 | 6/2019 |
| TW | I732642 | 7/2021 |

OTHER PUBLICATIONS

"Office Action of Taiwan Counterpart Application", dated Dec. 30, 2022, p. 1-p. 7.

* cited by examiner

*Primary Examiner* — Jae U Yu
(74) *Attorney, Agent, or Firm* — JCIPRNET (57) ABSTRACT

A memory management method configured for a rewritable non-volatile memory module, a memory storage device, and a memory control circuit unit are provided. The rewritable non-volatile memory module includes a plurality of dies, wherein each of the dies includes a plurality of planes, each of the planes includes a plurality of physical erasing units, and a sum of a number of the planes included in the rewritable non-volatile memory module is a first number. The method includes: grouping the plurality of physical erasing units into a plurality of management units. Each of the plurality of physical erasing units included in each of the management units belongs to a different plane, and each of the management units has a second number of the physical erasing units, wherein the second number is less than the first number.

21 Claims, 8 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 111109563, filed on Mar. 16, 2022. The entirety of the above-mentioned patent application is hereby incorporated by reference herein and made a part of this specification.

BACKGROUND OF THE INVENTION

Field of the Invention

The invention relates to a memory management technique, and more particularly, to a memory management method, a memory storage device, and a memory control circuit unit.

Description of Related Art

In general, a memory storage device may operate a plurality of blocks belonging to different operating units (e.g., planes, channels, or dies) into block groups. The memory storage devices reserve spare blocks in advance to be replaced when bad block management detects and marks faulty blocks in a block group. This prevents data from being written to the faulty blocks again. However, when the block used for replacement belongs to another operating unit, the speed of data access is significantly reduced. If the block is not replaced when a faulty block is detected, and the data in the block group is accessed by skipping the faulty block, due to the different number of blocks included in each of the block groups, additional processing is needed when moving data. The bad block management methods cause the memory storage device to run erratically.

SUMMARY OF THE INVENTION

The invention provides a memory management method, a memory storage device, and a memory control circuit unit that may improve the speed stability of the memory storage device.

An exemplary embodiment of the invention provides a memory management method configured for a rewritable non-volatile memory module. The rewritable non-volatile memory module includes a plurality of dies, wherein each of the plurality of dies includes a plurality of planes, each of the plurality of planes includes a plurality of physical erasing units, and a sum of a number of the plurality of planes included in the rewritable non-volatile memory module is a first number. The memory management method includes: grouping the plurality of physical erasing units into a plurality of management units. Each of the plurality of physical erasing units included in each of the plurality of management units respectively belongs to a plurality of different planes, and each of the plurality of management units has a second number of the plurality of physical erasing units. The second number is less than the first number.

In an exemplary embodiment of the invention, the management units include a first management unit. The method further includes: extracting, in response to detecting that the first management unit includes a first bad physical erasing unit, a first replacement physical erasing unit to replace the first bad physical erasing unit. The first replacement physical erasing unit and the first bad physical erasing unit belong to a same plane.

In an exemplary embodiment of the invention, the method further includes: recording a replacement information of the first bad physical erasing unit and the first replacement physical erasing unit in a first management table.

In an exemplary embodiment of the invention, the method further includes: accessing, according to the first management table, the first replacement physical erasing unit when accessing the first management unit.

In an exemplary embodiment of the invention, the first management table records a replacement information of all bad physical erasing units and replacement physical erasing units in the plurality of physical erasing units.

In an exemplary embodiment of the invention, each of the management units has a same number of the plurality of physical erasing units.

In an exemplary embodiment of the invention, the step of grouping the plurality of physical erasing units into the plurality of management units includes: grouping the plurality of physical erasing units into the plurality of management units according to a second management table, wherein the second management table records all bad physical erasing units in the rewritable non-volatile memory module.

An exemplary embodiment of the invention provides a memory storage device including a connection interface unit, a rewritable non-volatile memory module, and a memory control circuit unit. The connection interface unit is configured to be coupled to a host system. The rewritable non-volatile memory module includes a plurality of dies, wherein each of the plurality of dies includes a plurality of planes, each of the plurality of planes includes a plurality of physical erasing units, and a sum of a number of the plurality of planes included in the rewritable non-volatile memory module is a first number. The memory control circuit unit is coupled to the connection interface unit and the rewritable non-volatile memory module. The memory control circuit unit is configured to group the plurality of physical erasing units into a plurality of management units. Each of the plurality of physical erasing units included in each of the plurality of management units respectively belongs to a plurality of different planes, and each of the plurality of management units has a second number of the plurality of physical erasing units. The second number is less than the first number.

In an exemplary embodiment of the invention, the management units include a first management unit. Moreover, in response to detecting that the first management unit includes a first bad physical erasing unit, the memory control circuit unit is further configured to extract a first replacement physical erasing unit to replace the first bad physical erasing unit. The first replacement physical erasing unit and the first bad physical erasing unit belong to a same plane.

In an exemplary embodiment of the invention, the memory control circuit unit is further configured to record a replacement information of the first bad physical erasing unit and the first replacement physical erasing unit in a first management table.

In an exemplary embodiment of the invention, the memory control circuit unit is further configured to, according to the first management table, access the first replacement physical erasing unit when accessing the first management unit.

In an exemplary embodiment of the invention, the first management table records a replacement information of all bad physical erasing units and replacement physical erasing units in the plurality of physical erasing units.

In an exemplary embodiment of the invention, each of the management units has a same number of the plurality of physical erasing units.

In an exemplary embodiment of the invention, the operation of grouping the plurality of physical erasing units into the plurality of management units includes: grouping the plurality of physical erasing units into the plurality of management units according to a second management table, wherein the second management table records all bad physical erasing units in the rewritable non-volatile memory module.

An exemplary embodiment of the invention provides a memory control circuit unit configured to control a rewritable non-volatile memory module. The rewritable non-volatile memory module includes a plurality of dies, wherein each of the plurality of dies includes a plurality of planes, each of the plurality of planes includes a plurality of physical erasing units, and a sum of a number of the plurality of planes included in the rewritable non-volatile memory module is a first number. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management unit is configured to group the plurality of physical erasing units into a plurality of management units. Each of the plurality of physical erasing units included in each of the plurality of management units respectively belongs to a plurality of different planes, and each of the plurality of management units has a second number of the plurality of physical erasing units. The second number is less than the first number.

In an exemplary embodiment of the invention, the management units include a first management unit. Moreover, in response to detecting that the first management unit includes a first bad physical erasing unit, the memory management circuit is further configured to extract a first replacement physical erasing unit to replace the first bad physical erasing unit. The first replacement physical erasing unit and the first bad physical erasing unit belong to a same plane.

In an exemplary embodiment of the invention, the memory management circuit is further configured to record a replacement information of the first bad physical erasing unit and the first replacement physical erasing unit in a first management table.

In an exemplary embodiment of the invention, the memory management circuit is further configured to, according to the first management table, access the first replacement physical erasing unit when accessing the first management unit.

In an exemplary embodiment of the invention, the first management table records a replacement information of all bad physical erasing units and replacement physical erasing units in the plurality of physical erasing units.

In an exemplary embodiment of the invention, each of the management units has a same number of the plurality of physical erasing units.

In an exemplary embodiment of the invention, the operation of grouping the plurality of physical erasing units into the plurality of management units includes: grouping the plurality of physical erasing units into the plurality of management units according to a second management table, wherein the second management table records all bad physical erasing units in the rewritable non-volatile memory module.

Based on the above, the memory control circuit unit groups the physical erasing units with a number less than the sum of the number of planes of the rewritable non-volatile memory module into management units for operation. The management units including the physical erasing units belong to different planes, so that the physical erasing units included in each of the management units do not correspond to all of the planes. In addition, the memory control circuit unit may replace a bad block in the management unit using a physical erasing unit belonging to the same plane. Thereby, the speed stability and operation flexibility of the memory storage device may be improved.

In order to make the aforementioned features and advantages of the disclosure more comprehensible, embodiments accompanied with figures are described in detail below.

DESCRIPTION OF THE EMBODIMENTS

In general, a memory storage device (also referred to as a memory storage system) includes a rewritable non-volatile memory module and a controller (also referred to as a control circuit unit). The memory storage device is generally used with a host system, such that the host system may write data into the memory storage device or read data from the memory storage device.

Figure 1:
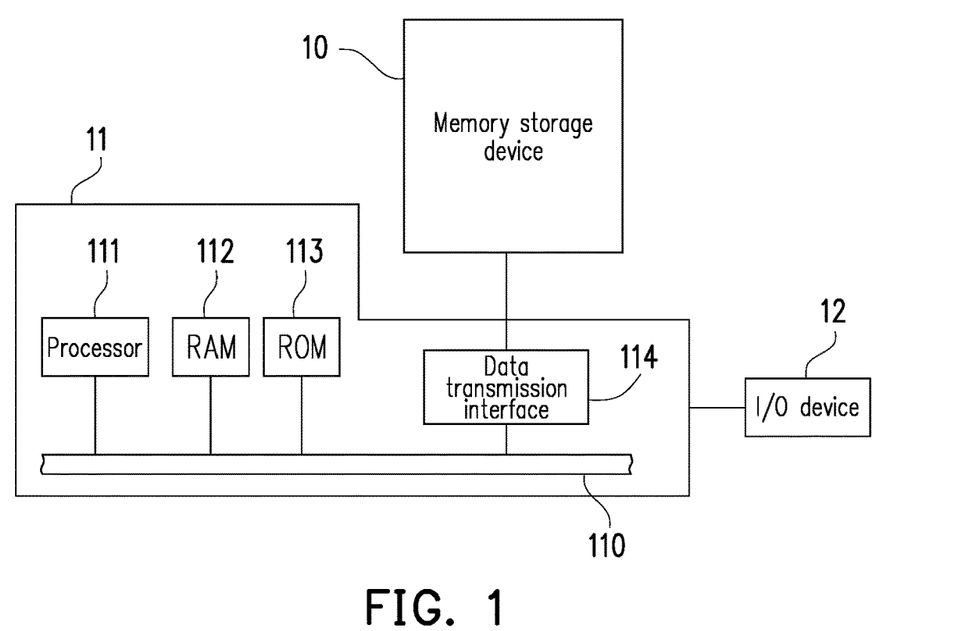
FIG. 1 is a diagram of a host system, a memory storage device, and an input/output (I/O) device shown according to an exemplary embodiment.

FIG. 1 is a diagram of a host system, a memory storage device, and an input/output (I/O) device shown according to an exemplary embodiment. Moreover, FIG. 2 is a diagram of a host system, a memory storage device, and an input/output (I/O) device shown according to another exemplary embodiment.

Figure 2:
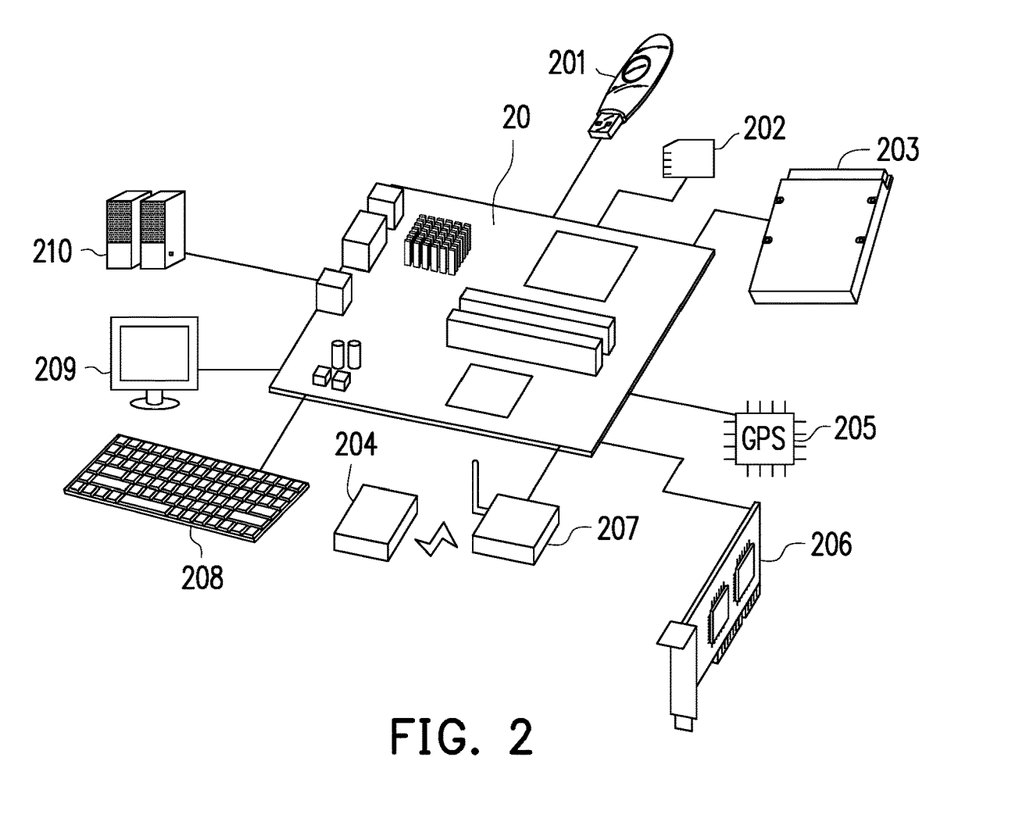
FIG. 2 is a diagram of a host system, a memory storage device, and an I/O device shown according to another exemplary embodiment.

Referring to FIG. 1 and FIG. 2, a host system 11 generally includes a processor 111, a random-access memory (RAM) 112, a read-only memory (ROM) 113, and a data transmission interface 114. The processor 111, the RAM 112, the ROM 113, and the data transmission interface 114 are all coupled to a system bus 110.

In the present exemplary embodiment, the host system 11 is coupled to the memory storage device 10 via the data transmission interface 114. For example, the host system 11 may write data into the memory storage device 10 via the data transmission interface 114 or read data from the memory storage device 10. Moreover, the host system 11 is coupled to the I/O device 12 via the system bus 110. For example, the host system 11 may send an output signal to the I/O device 12 or receive an input signal from the I/O device 12 via the system bus 110.

In the present exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114. The memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

Figure 3:
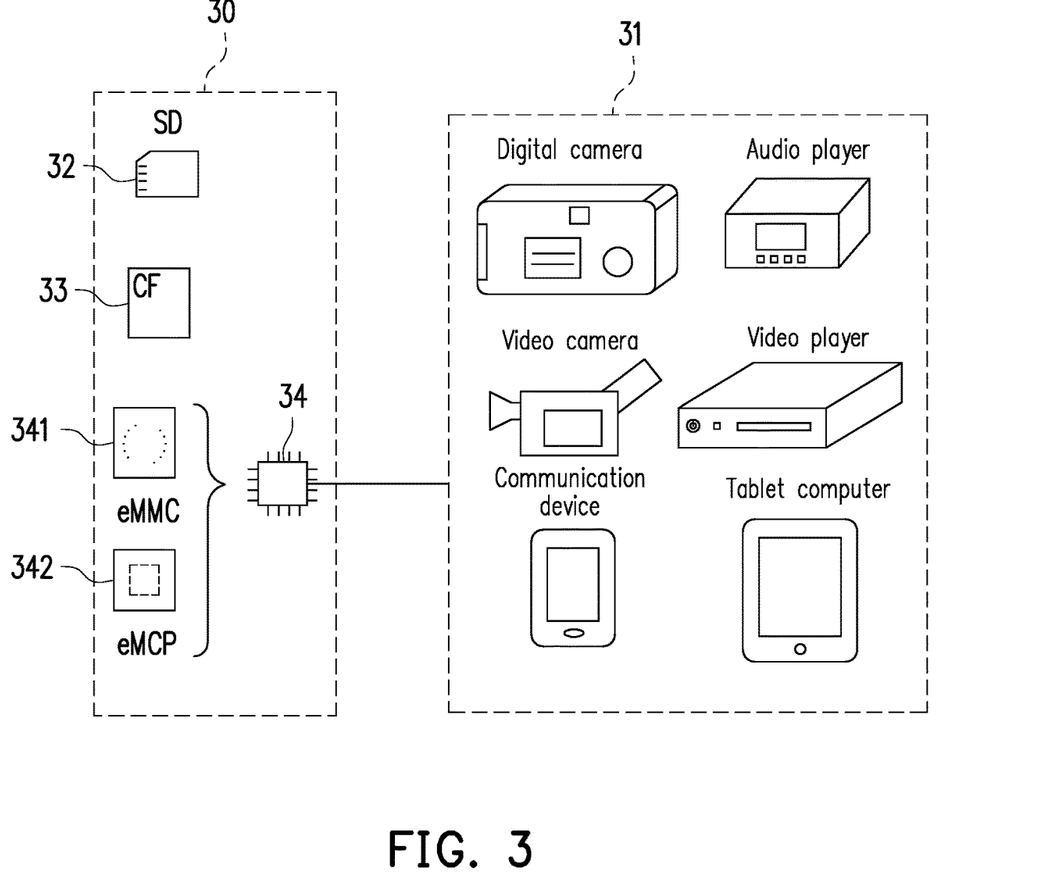
FIG. 3 is a diagram of a host system and a memory storage device shown according to another exemplary embodiment.

In an exemplary embodiment, the mentioned host system is any system that may substantially store data with the memory storage device. Although in the above exemplary embodiments, the host system is exemplified by a computer system, FIG. 3 is a diagram of a host system and a memory storage device shown according to another exemplary embodiment. Referring to FIG. 3, in another exemplary embodiment, the host 31 may also be a system such as a digital camera, a video camera, a communication device, an audio player, a video player, or a tablet computer, and the memory storage device 30 may be various non-volatile memory storage devices used thereby such as an SD card 32, a CF card 33, or an embedded storage device 34. The embedded storage device 34 includes various types of embedded storage devices for which a memory module is directly coupled on the substrate of the host system, such as an embedded multimedia card (eMMC) 341 and/or an embedded multi-chip package (eMCP) 342.

Figure 4:
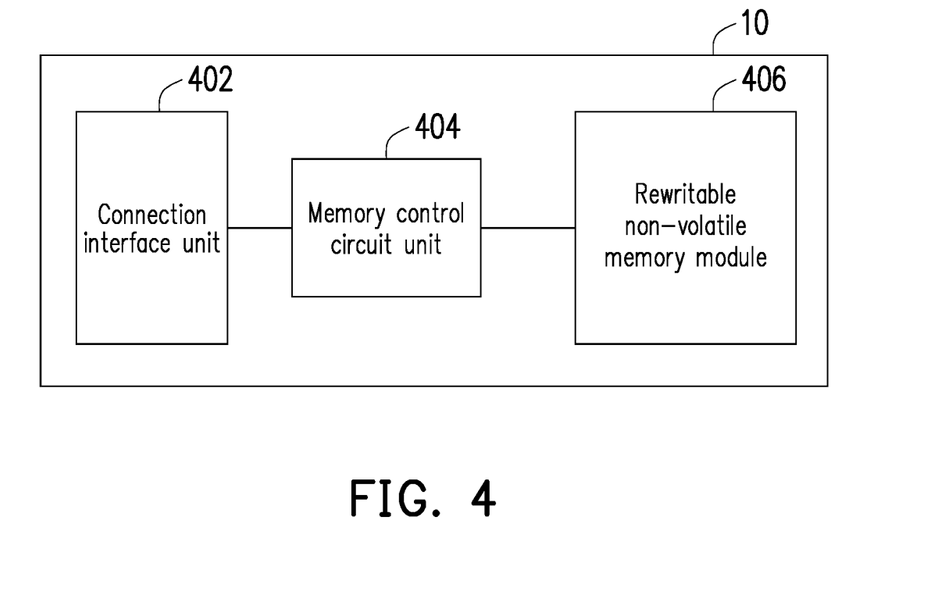
FIG. 4 is a schematic block diagram of a memory storage device shown according to an exemplary embodiment of the invention.

FIG. 4 is a schematic block diagram of a memory storage device shown according to an exemplary embodiment of the invention. Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 via the connection interface unit 402. In the present exemplary embodiment, the connection interface unit 402 is compatible with the serial advanced technology attachment (SATA) standard. However, it should be understood that the invention is not limited thereto, and the connection interface unit 402 may also comply with the Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 402 may be sealed in a chip with the memory control circuit unit 404. Alternatively, the connection interface unit 402 is disposed outside of a chip containing the memory control circuit unit 404.

The memory control circuit unit 404 is configured to execute a plurality of logic gates or control commands implemented in a hardware form or in a firmware form. The memory control circuit unit 404 also performs operations such as writing, reading, and erasing data in the rewritable non-volatile memory storage module 406 according to the commands of the host system 11.

The rewritable non-volatile memory module 406 is coupled to the memory control circuit unit 404 and configured to store data written by the host system 11. The rewritable non-volatile memory module 406 may be a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 406 stores one or a plurality of bits via the change in voltage (also referred to as threshold voltage hereinafter). Specifically, a charge trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 406 has a plurality of storage states. Which storage state one memory cell belongs to may be determined via the application of a read voltage, so as to obtain one or a plurality of bits stored by the memory cell.

In the present exemplary embodiment, the memory cells of the rewritable non-volatile memory module 406 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In the present exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundant bit area. The data bit area contains a plurality of physical pages configured to store user data, and the redundant bit area is configured to store system data (for example, management data such as an error correcting code). In the present exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erase units contains the smallest number of memory cells erased together. For example, the physical erasing unit is a physical block.

Figure 5:
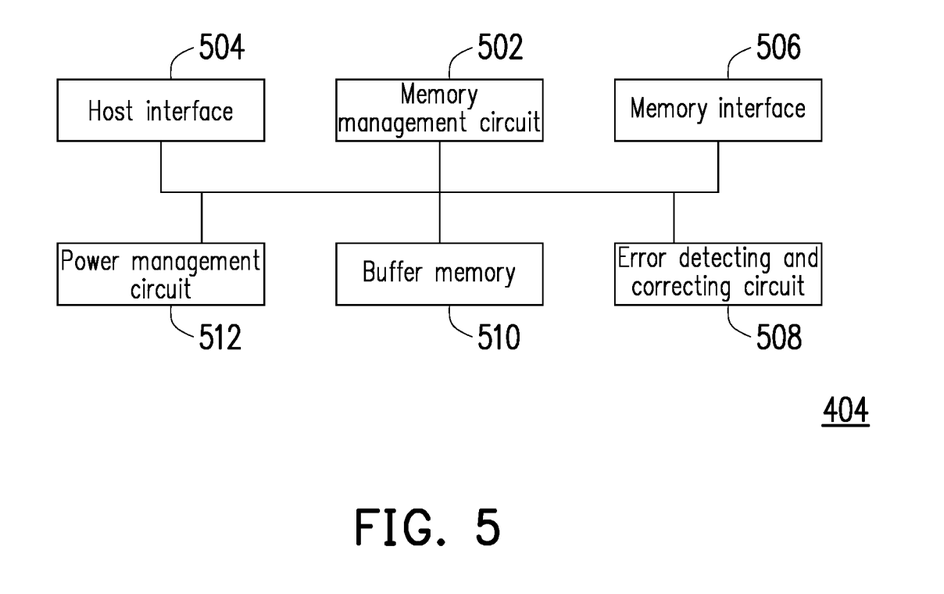
FIG. 5 is a schematic block diagram of a memory control circuit unit shown according to an exemplary embodiment of the invention.

FIG. 5 is a schematic block diagram of a memory control circuit unit shown according to an exemplary embodiment of the invention. Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands. During the operation of the memory storage device 10, the control commands are executed to perform operations such as writing, reading, and erasing data. In the following, descriptions relating to the operation of the memory management circuit 502 are equivalent to the descriptions of the operation of the memory control circuit unit 404.

In the present exemplary embodiment, the control commands of the memory management circuit 502 are implemented in a firmware form. For example, the memory management circuit 502 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In another exemplary embodiment, the control commands of the memory management circuit 502 may also be stored in the form of program codes in a specific area (for example, the system area in a memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the boot code to load the control commands stored in the rewritable non-volatile memory module 406 into the RAM of the memory management circuit 502. Next, the microprocessor unit runs the control commands to perform operations such as writing, reading, and erasing data.

Further, in another exemplary embodiment, the control commands of the memory management circuit 502 may also be implemented in a hardware form. For example, the memory management circuit 502 includes a microcontroller, memory cell management circuit, memory write circuit, memory read circuit, memory erase circuit, and data processing circuit. The memory cell management circuit, memory write circuit, memory read circuit, memory erase circuit, and data processing circuit are coupled to the microcontroller. The memory cell management circuit is configured to manage the memory cells or memory cell groups of the rewritable non-volatile memory module 406. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. The write command sequence, read command sequence, and erase command sequence may independently include one or a plurality of program codes or command codes and be configured to instruct the rewritable non-volatile memory module 406 to perform corresponding operations such as writing, reading, and erasing. In an exemplary embodiment, the memory management circuit 502 may also issue other types of command sequences to the rewritable non-volatile memory module 406 to instruct the performance of corresponding operations.

The host interface 504 is coupled to the memory management circuit 502. The memory management circuit 502 may communicate with the host system 11 via the host interface 504. The host interface 504 may be configured to receive and identify commands and data sent by the host system 11. For example, the commands and data sent by the host system 11 may be sent to the memory management circuit 502 via the host interface 504. In addition, the memory management circuit 502 may send data to the host system 11 via the host interface 504. In the present exemplary embodiment, the host interface 504 is compatible with the SATA standard. However, it should be understood that the invention is not limited thereto, and the host interface 504 may also be compatible with the PATA standard, IEEE 1394 standard, PCI Express standard, USB standard, SD standard, UHS-I standard, UHS-II standard, MS standard, MMC standard, eMMC standard, UFS standard, CF standard, IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 sends a corresponding command sequence. For example, the command sequence may include a write command sequence instructing data writing, a read command sequence instructing data reading, an erase command sequence instructing data erasing, and corresponding command sequences configured to instruct various memory operations (such as changing read voltage level or executing a garbage collection operation). The command sequences are generated by, for example, the memory management circuit 502 and sent to the rewritable non-volatile memory module 406 via the memory interface 506. The command sequences may include one or a plurality of signals or data on a bus. The signals or data may include a command code or a program code. For example, when reading a command sequence, information such as read identification code or memory address is included.

In an exemplary embodiment, the memory control circuit unit 404 further includes an error detecting and correcting circuit 508, a buffer memory 510, and a power management circuit 512.

The error detecting and correcting circuit 508 is coupled to the memory management circuit 502 and configured to execute an error detecting and correcting operation to ensure the correctness of data. Specifically, when the memory management circuit 502 receives a write command from the host system 11, the error detecting and correcting circuit 508 generates a corresponding error correcting code (ECC) and/or an error detecting code (EDC) for data corresponding to the write command, and the memory management circuit 502 writes the data corresponding to the write command and the corresponding ECC and/or EDC into the rewritable non-volatile memory module 406. Next, when reading data from the rewritable non-volatile memory module 406, the memory management circuit 502 reads the ECC and/or the EDC corresponding to the data at the same time, and the error detecting and correcting circuit 508 executes an error detecting and correcting operation on the read data based on the ECC and/or the EDC.

The buffer 510 is coupled to the memory management circuit 502 and configured to temporarily store data and commands from the host system 11 or data from the rewritable non-volatile memory module 406. The power management circuit 512 is coupled to the memory management circuit 502 and configured to control the power of the memory storage device 10.

In an exemplary embodiment, the rewritable non-volatile memory module 406 of FIG. 4 is also referred to as a flash memory module, the memory control circuit unit 404 is also referred to as a flash memory controller configured to control the flash memory module, and/or the memory management circuit 502 of FIG. 5 is also referred to as a flash memory management circuit.

Figure 6:
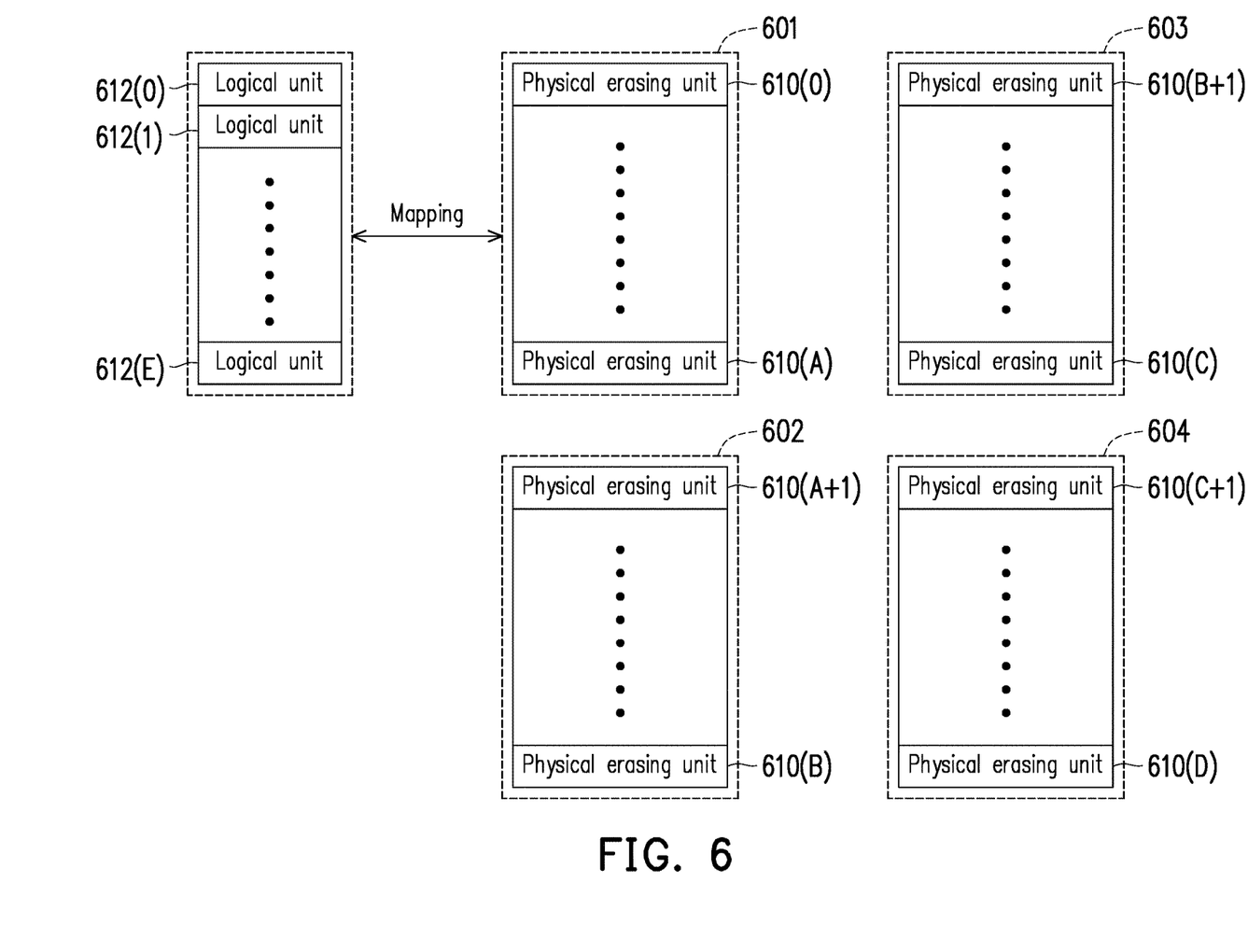
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention.

Referring to FIG. 6, the memory management circuit 502 logically groups physical units 610(0) to 610(D) of the rewritable non-volatile memory module 406 into a storage area 601, a spare area 602, a replacement area 603, and a system area 604. In the present exemplary embodiment, each physical unit may refer to one or a plurality of physical erasing units.

It should be understood that, when describing the operation of the memory storage device, the operation of the physical units of the rewritable non-volatile memory module 406 using such terms as "extract", "move", "exchange", "replace", "rotate", "divide", "partition" is a logical concept. In other words, the actual locations of the physical units of the rewritable non-volatile memory module 406 are not changed, and instead operation is logically performed on the physical units of the rewritable non-volatile memory module 406.

The physical units 610(0) to 610(A) in the storage area 601 store data. For example, the physical units 610(0) to 610(A) in the storage area 601 may store valid data and invalid data. The physical units 610(A+1) to 610(B) in the spare area 602 are not yet configured to store data (for example, valid data). When data is to be stored, the memory management circuit 502 selects one physical unit from the physical units 610(A+1) to 610(B) in the spare area 602, and stores the data from the host system 11 or from at least one physical unit in the storage area 601 in the selected physical unit. At the same time, the selected physical unit is associated with the storage area 601. In addition, after a certain physical unit in the storage area 601 is erased, the erased physical unit is re-associated with the spare area 602.

The physical units 610(B+1) to 610(C) in the replacement area 603 are configured to replace the damaged physical units in the storage area 601. For example, if the data read from a certain physical unit contains too many errors and may not be corrected, the physical unit is considered a damaged physical unit (also known as a bad physical erasing unit). Moreover, if there is no physical erasing unit available in the replacement area 603, the memory management circuit 502 may declare the entire memory storage device 10 as a write protect state and data may no longer be written. The physical units 610(C+1) to 610(D) in the system area 604 are configured to store system data, such as a logical-to-physical mapping table, bad block management table, device model, or other types of management data.

The memory management circuit 502 configures logical units 612(0) to 612(E) to map the physical units 610(0) to 610(A) in the storage area 601. Each of the logical units 612(0) to 612(E) may be mapped to one or a plurality of physical units. The memory management circuit 502 records the mapping relationship between the logical units and the physical units (also referred to as logical-to-physical mapping information) to at least one logical-physical mapping table. The logical-to-physical mapping table may be stored in the physical units 610(C+1) to 610(D) of the system area 604. When the host system 11 is to read data from the memory storage device 10 or write data to the memory storage device 10, the memory management circuit 502 may execute a data access operation on the memory storage device 10 according to the logical-physical mapping table.

In an exemplary embodiment, the rewritable non-volatile memory module 406 may include a plurality of dies and have a plurality of planes, wherein each of the planes belongs to one die. The rewritable non-volatile memory module 406 may include a plurality of planes with a sum of a first number. In the present exemplary embodiment, the number of planes may be greater than the number of dies. That is, two or more planes may belong to one die. Each of the planes may include a plurality of physical erasing units and a plurality of physical programming units, and the plurality of physical programming units are grouped into one physical erasing unit.

Figure 7:
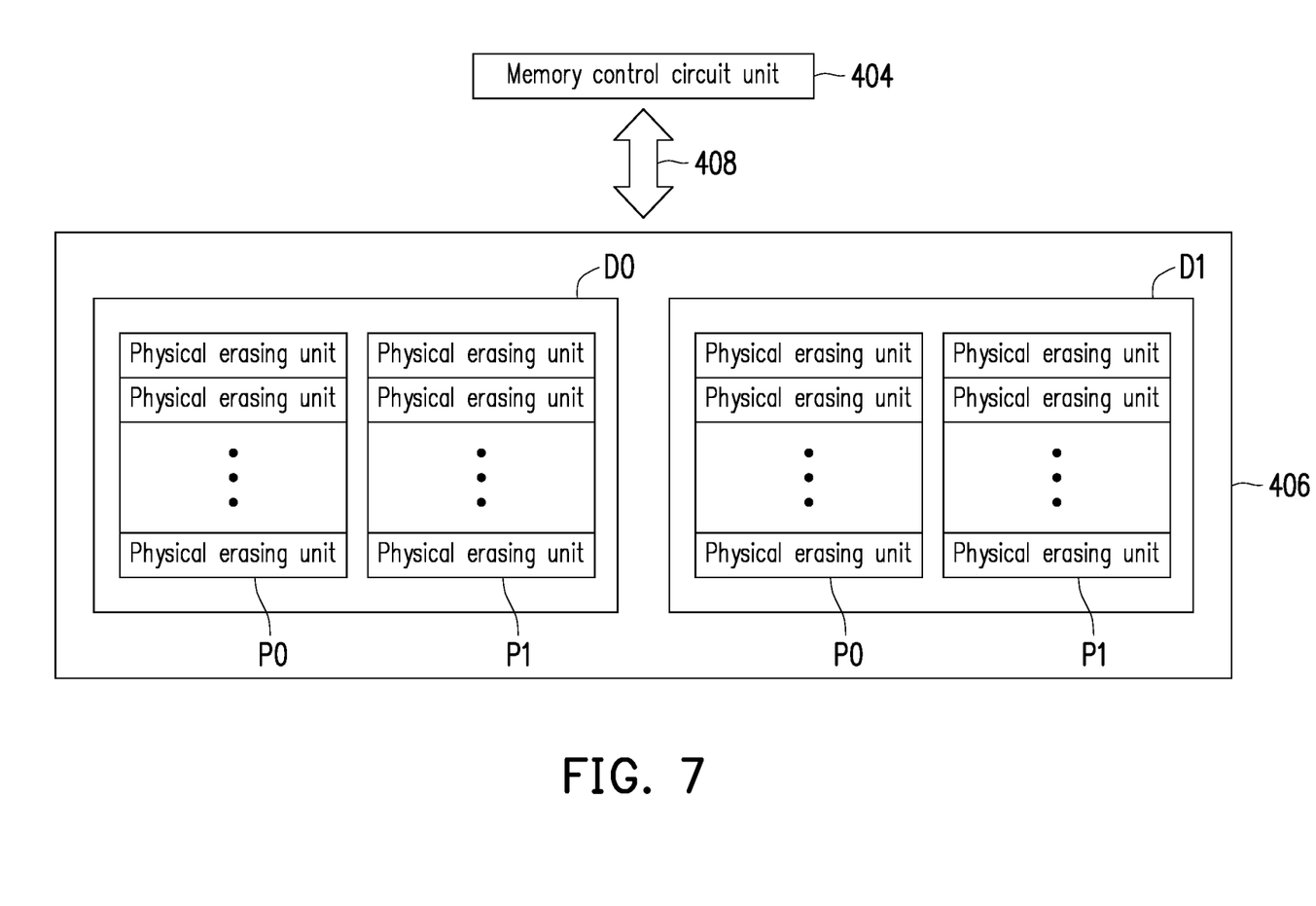
FIG. 7 is a schematic diagram of a memory control circuit unit coupled to a rewritable non-volatile memory module shown according to an exemplary embodiment of the invention.

FIG. 7 is a schematic diagram of a memory control circuit unit coupled to a rewritable non-volatile memory module shown according to an exemplary embodiment of the invention. Referring to FIG. 7, the rewritable non-volatile memory module 406 includes two dies D0 and D1, and each of the dies includes two planes P0 and P1. In the present exemplary embodiment, the rewritable non-volatile memory module 406 includes four planes, and therefore the sum of the number of planes is four (i.e., the first number is four). Each of the plane P0 and the plane P1 includes a plurality of physical erasing units, and each of the physical erasing units is composed of a plurality of physical programming units. However, in different embodiments, the rewritable non-volatile memory module 406 may include more or less dies, and each of the dies may include more or less planes, and the invention is not limited herein.

In the present exemplary embodiment, the die D0 and the die D1 are respectively coupled to the memory control circuit unit 404 via a chip enable pin. The memory control circuit unit 404 may send an enable signal to the chip enable pins of the die D0 and the die D1 to enable the die D0 and the die D1 respectively. After the dies are enabled, the memory control circuit unit 404 may access data via a channel 408 (e.g., a data bus). The channel 408 may include one or a plurality of channels. That is to say, the physical programming units included in the plane P0 and the plane P1 of the die D0 and the plane P0 and the plane P1 of the die D1 are accessed via the channel 408. In an exemplary embodiment, data stored in the plane P0 and the plane P1 may be accessed via the channel 408 using a single-plane access operation or a multi-plane access operation, wherein the data stored in the plane P0 and the plane P1 may be accessed in parallel using a multi-plane access operation.

In the present exemplary embodiment, the memory control circuit unit 404 may also enable a plurality of dies at the same time via one enable signal, or enable a plurality of dies respectively via a plurality of enable signals. Also, data stored in different dies may be accessed via different channels. Taking FIG. 7 as an example, the data stored in the plane P0 and the plane P1 of the die D0 may be accessed via one channel, and the data stored in the plane P0 and the plane P1 of the die D1 may be accessed via another channel.

In an exemplary embodiment, the memory control circuit unit 404 groups a plurality of physical erasing units into one management unit, and the rewritable non-volatile memory module 406 includes a plurality of management units. Each of the plurality of physical erasing units included in each of the management units belongs to a different plane, and each of the management units has a fixed number of physical erasing units (also referred to as the second number). In the present exemplary embodiment, the second number is less than the sum of the number of the plurality of planes (i.e., the first number) included in the rewritable non-volatile memory module 406. In an exemplary embodiment, each of the plurality of management units has the same number of physical erasing units.

In an exemplary embodiment, when the memory control circuit unit 404 groups a plurality of physical erasing units into a management unit, a plurality of physical erasing units may be grouped into one management unit according to a bad block record management table (also referred to as a second management table, for example, a DBT (defect block table) recording bad blocks). The bad block record management table records all bad physical erasing units in the rewritable non-volatile memory module 406. Specifically, in general, bad physical erasing units may appear in the rewritable non-volatile memory module 406 due to poor manufacturing process. When initially grouping the management units, the memory control circuit unit 404 may exclude the bad physical erasing units according to the bad block record management table and group a plurality of normal physical erasing units into management units respectively.

Figure 8A:
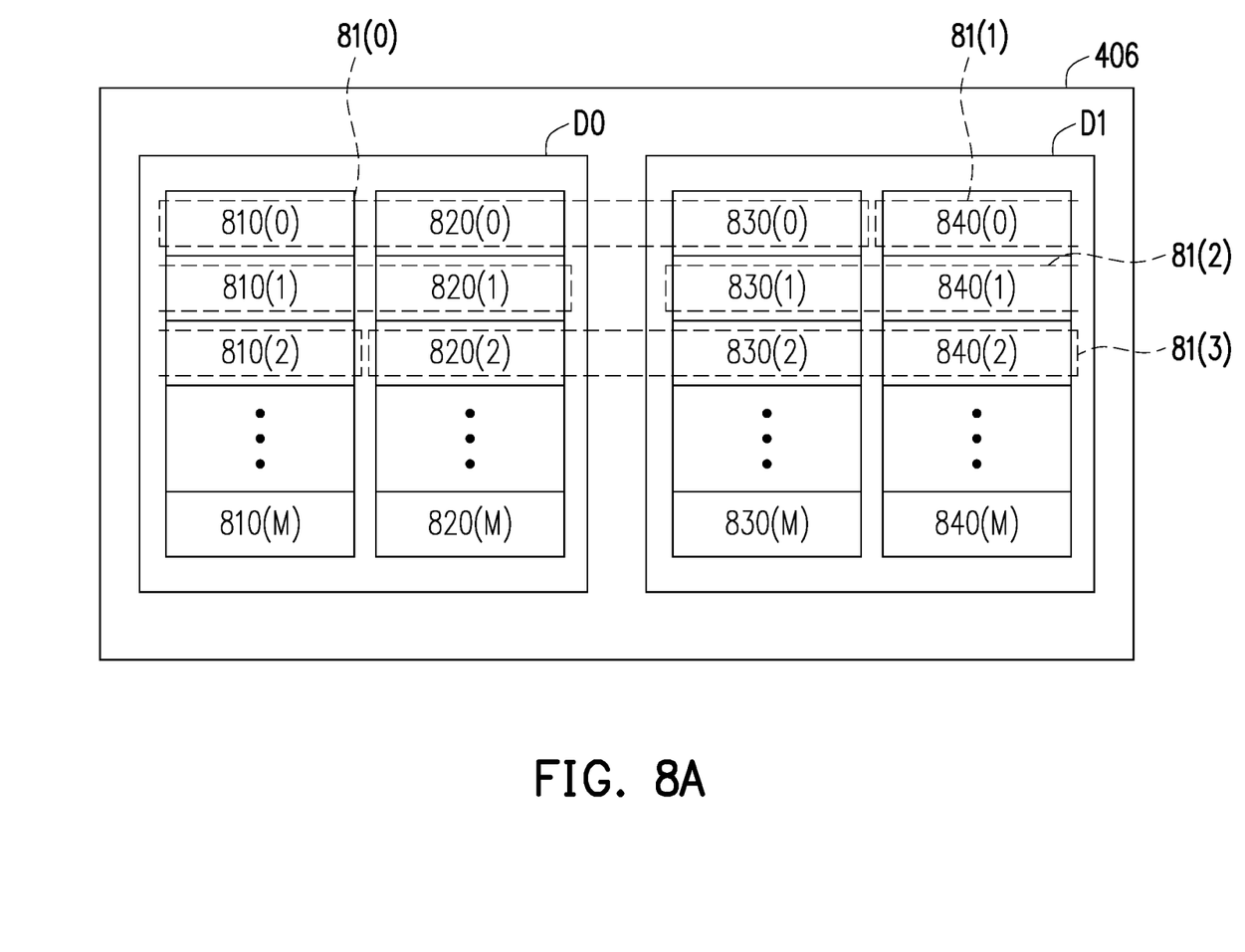
FIG. 8A is a schematic diagram of a rewritable non-volatile memory module shown according to an exemplary embodiment of the invention.

FIG. 8A is a schematic diagram of a rewritable non-volatile memory module shown according to an exemplary embodiment of the invention. Referring to FIG. 8A, the rewritable non-volatile memory module 406 includes four planes (the plane P0 and the plane P1 of the die D0, and the plane P0 and the plane P1 of the die D1). In particular, the plane P0 of the die D0 includes physical erasing units 810(0) to 810(M), the plane P1 of the die D0 includes physical erasing units 820(0) to 820(M), the plane P0 of the die D1 includes physical erasing units 830(0) to 830(M), and the plane P1 of the die D1 includes physical erasing units 840(0) to 840(M). For the convenience of description, it is assumed that the rewritable non-volatile memory module 406 includes management unit 81(0) to the management unit 81(3). However, the invention does not limit the number of the management units. Each of the management units includes three physical erasing units. As shown in FIG. 8A, the number of physical erasing units included in each of the management units is less than the sum of the number of planes included in the rewritable non-volatile memory module 406.

In an exemplary embodiment, when a physical erasing unit normally used by the rewritable non-volatile memory module 406 is damaged, the physical erasing block is regarded as a bad physical erasing unit. Damage may occur during poor manufacturing processes, or may occur after repeated erases such that the data read in the physical erasing units contains too many errors and may not be corrected. When damage occurs, the memory control circuit unit 404 may extract the physical erasing units from the replacement area 603 to replace the damaged bad physical erasing units in the storage area 601.

Figure 8B:
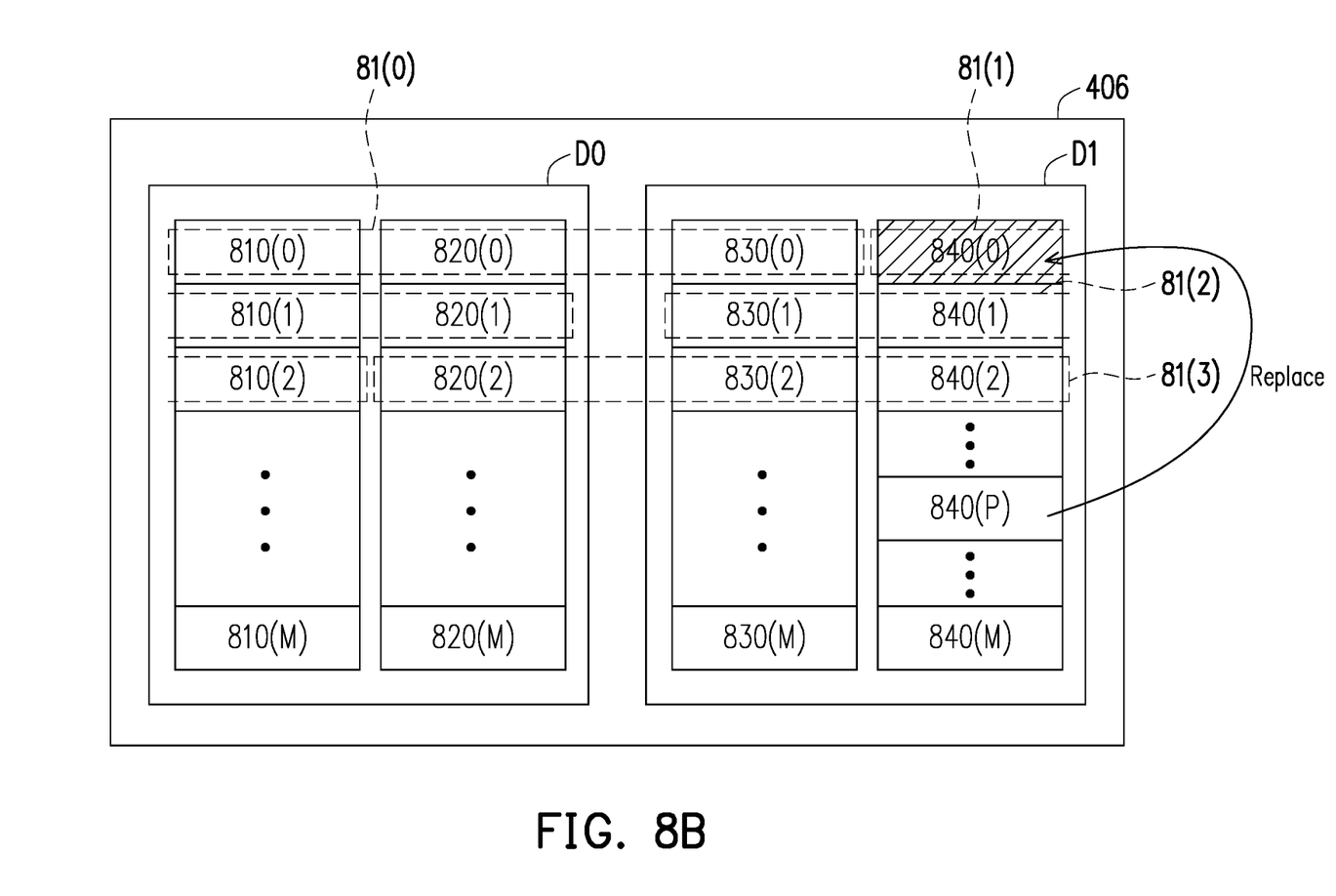
FIG. 8B is a schematic diagram of a rewritable non-volatile memory module shown according to an exemplary embodiment of the invention.

FIG. 8B is a schematic diagram of a rewritable non-volatile memory module shown according to an exemplary embodiment of the invention. Referring to FIG. 8B, it is assumed that the physical erasing unit 840(0) (the bad physical erasing unit in the present exemplary embodiment) is damaged. In response to detecting that the management unit 81(1) (also referred to as a first management unit) includes the physical erasing unit 840(0) (also referred to as a first bad physical erasing unit), the memory control circuit unit 404 extracts a replacement physical erasing unit (also referred to as a first replacement physical erasing unit) to replace the physical erasing unit 840(0). In the present exemplary embodiment, the replacement physical erasing unit and the bad physical erasing unit belong to the same plane. As shown in FIG. 8B, the memory control circuit unit 404 extracts the physical erasing unit 840(P) belonging to the same plane as the physical erasing unit 840(0) to replace the bad physical erasing unit 840(0).

In an exemplary embodiment, the memory control circuit unit 404 records the replacement information of the bad physical erasing unit and the replacement physical erasing unit in the bad block replacement management table (also referred to as a first management table, for example, the RUT (replace unit table) managing bad block replacement). The bad block replacement management table records the replacement information of all bad physical erasing units and replacement physical erasing units. Taking FIG. 8B as an example, the memory control circuit unit 404 records the replacement information of the bad physical erasing unit 840(0) and the replacement physical erasing unit 840(P) in the bad block replacement management table. When the memory control circuit unit 404 accesses the management unit 81(1), if the accessed address is the address of the original physical erasing unit 840(0), the memory control circuit unit 404 is changed to access the physical erasing unit 840(P) according to the bad block replacement management table. That is, if the memory control circuit unit 404 accesses the management unit 81(1), the memory control circuit unit 404 accesses the physical erasing unit 840 (P) when accessing the management unit 81(1) according to the first management table.

Figure 9:
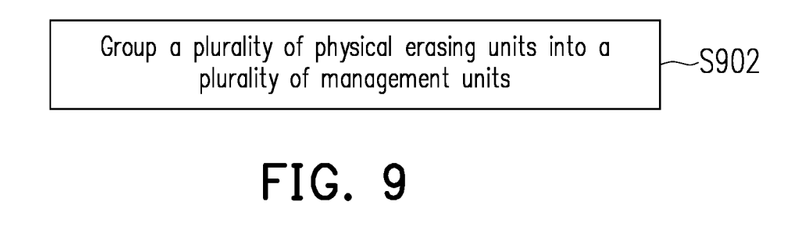
FIG. 9 is a flowchart of a memory management method shown according to an exemplary embodiment of the invention.

FIG. 9 is a flowchart of a memory management method shown according to an exemplary embodiment of the invention. Referring to FIG. 9, in step S902, a plurality of physical erasing units are grouped into a plurality of management units. In particular, each of the plurality of physical erasing units included in each of the management units respectively belongs to a plurality of different planes, and each of the management units has a second number of the physical erasing units.

Based on the above, an exemplary embodiment provided by the invention provides that the physical erasing units with a number less than the sum of the number of planes of the rewritable non-volatile memory module are grouped into management units for operation, and the physical erasing units belong to different planes respectively. In this way, the physical erasing units included in each of the management units do not correspond to all of the planes. In this way, the chance of exhaustion of normal physical erasing units of the same plane may be reduced when there are too many bad blocks, so that the tolerance of each of the planes to bad blocks is improved. Thus, the probability of needing to replace bad blocks using the physical erasing units of another operating unit when the physical erasing units of the same operating unit are exhausted is reduced. In addition, by replacing bad blocks, the number of physical erasing units included in each of the management units may be kept the same without additional processing during the data transfer operation. Thereby, the speed stability and operation flexibility of the memory storage device may be effectively improved.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A memory management method, configured for a rewritable non-volatile memory module, wherein the rewritable non-volatile memory module comprises a plurality of dies, each of the plurality of dies comprises a plurality of planes, each of the plurality of planes comprises a plurality of physical erasing units, a sum of a number of the plurality of planes comprised in the rewritable non-volatile memory module is a first number, and the memory management method comprises:

grouping the plurality of physical erasing units into a plurality of management units, wherein each of the plurality of physical erasing units comprised in each of the plurality of management units respectively belongs to a plurality of different planes, and each of the plurality of management units has a second number of the plurality of physical erasing units, wherein the second number is less than the first number.

2. The memory management method of claim 1, wherein the plurality of management units comprise a first management unit, and the method further comprises:

extracting, in response to detecting that the first management unit comprises a first bad physical erasing unit, a first replacement physical erasing unit to replace the first bad physical erasing unit, wherein the first replacement physical erasing unit and the first bad physical erasing unit belong to a same plane.

3. The memory management method of claim 2, wherein the method further comprises:

recording a replacement information of the first bad physical erasing unit and the first replacement physical erasing unit in a first management table.

4. The memory management method of claim 3, wherein the method further comprises:

accessing, according to the first management table, the first replacement physical erasing unit when accessing the first management unit.

5. The memory management method of claim 3, wherein the first management table records a replacement information of all bad physical erasing units and replacement physical erasing units in the plurality of physical erasing units.

6. The memory management method of claim 1, wherein each of the plurality of management units has a same number of the plurality of physical erasing units.

7. The memory management method of claim 1, wherein the step of grouping the plurality of physical erasing units into the plurality of management units comprises:

grouping the plurality of physical erasing units into the plurality of management units according to a second management table, wherein the second management table records all bad physical erasing units in the rewritable non-volatile memory module.

8. A memory storage device, comprising:

a connection interface unit configured to be coupled to a host system;

a rewritable non-volatile memory module, wherein the rewritable non-volatile memory module comprises a plurality of dies, each of the plurality of dies comprises a plurality of planes, each of the plurality of planes comprises a plurality of physical erasing units, and a sum of a number of the plurality of planes comprised in the rewritable non-volatile memory module is a first number; and a memory control circuit unit coupled to the connection interface unit and the rewritable non-volatile memory module, wherein the memory control circuit unit is configured to group the plurality of physical erasing units into a plurality of management units, wherein each of the plurality of physical erasing units comprised in each of the plurality of management units respectively belongs to a plurality of different planes, and each of the plurality of management units has a second number of the plurality of physical erasing units, wherein the second number is less than the first number.

9. The memory storage device of claim 8, wherein the plurality of management units comprise a first management unit, and in response to detecting that the first management unit comprises a first bad physical erasing unit, the memory control circuit unit is further configured to extract a first replacement physical erasing unit to replace the first bad physical erasing unit, wherein the first replacement physical erasing unit and the first bad physical erasing unit belong to a same plane.

10. The memory storage device of claim 9, wherein the memory control circuit unit is further configured to record a replacement information of the first bad physical erasing unit and the first replacement physical erasing unit in a first management table.

11. The memory storage device of claim 10, wherein the memory control circuit unit is further configured to access the first replacement physical erasing unit when accessing the first management unit according to the first management table.

12. The memory storage device of claim 10, wherein the first management table records a replacement information of all bad physical erasing units and replacement physical erasing units in the plurality of physical erasing units.

13. The memory storage device of claim 8, wherein each of the plurality of management units has a same number of the plurality of physical erasing units.

14. The memory storage device of claim 8, wherein the operation of grouping the plurality of physical erasing units into the plurality of management units comprises:
grouping the plurality of physical erasing units into the plurality of management units according to a second management table, wherein the second management table records all bad physical erasing units in the rewritable non-volatile memory module.

15. A memory control circuit unit, configured to control a rewritable non-volatile memory module, wherein the rewritable non-volatile memory module comprises a plurality of dies, each of the plurality of dies comprises a plurality of planes, each of the plurality of planes comprises a plurality of physical erasing units, and a sum of a number of the plurality of planes comprised in the rewritable non-volatile memory module is a first number, wherein the memory control circuit unit comprises:
a host interface configured to be coupled to a host system;
a memory interface configured to be coupled to the rewritable non-volatile memory module; and
a memory management circuit coupled to the host interface and the memory interface,
wherein the memory management unit is configured to group the plurality of physical erasing units into a plurality of management units,
wherein each of the plurality of physical erasing units comprised in each of the plurality of management units respectively belongs to a plurality of different planes, and each of the plurality of management units has a second number of the plurality of physical erasing units,
wherein the second number is less than the first number.

16. The memory control circuit unit of claim 15, wherein the plurality of management units comprise a first management unit, and in response to detecting that the first management unit comprises a first bad physical erasing unit, the memory management circuit is further configured to extract a first replacement physical erasing unit to replace the first bad physical erasing unit,
wherein the first replacement physical erasing unit and the first bad physical erasing unit belong to a same plane.

17. The memory control circuit unit of claim 16, wherein the memory management circuit is further configured to record a replacement information of the first bad physical erasing unit and the first replacement physical erasing unit in a first management table.

18. The memory control circuit unit of claim 17, wherein the memory management circuit is further configured to access the first replacement physical erasing unit when accessing the first management unit according to the first management table.

19. The memory control circuit unit of claim 17, wherein the first management table records a replacement information of all bad physical erasing units and replacement physical erasing units in the plurality of physical erasing units.

20. The memory control circuit unit of claim 15, wherein each of the plurality of management units has a same number of the plurality of physical erasing units.

21. The memory control circuit unit of claim 15, wherein the operation of grouping the plurality of physical erasing units into the plurality of management units comprises:
grouping the plurality of physical erasing units into the plurality of management units according to a second management table, wherein the second management table records all bad physical erasing units in the rewritable non-volatile memory module.

* * * * *